United States Patent Office 3,525,685
Patented Aug. 25, 1970

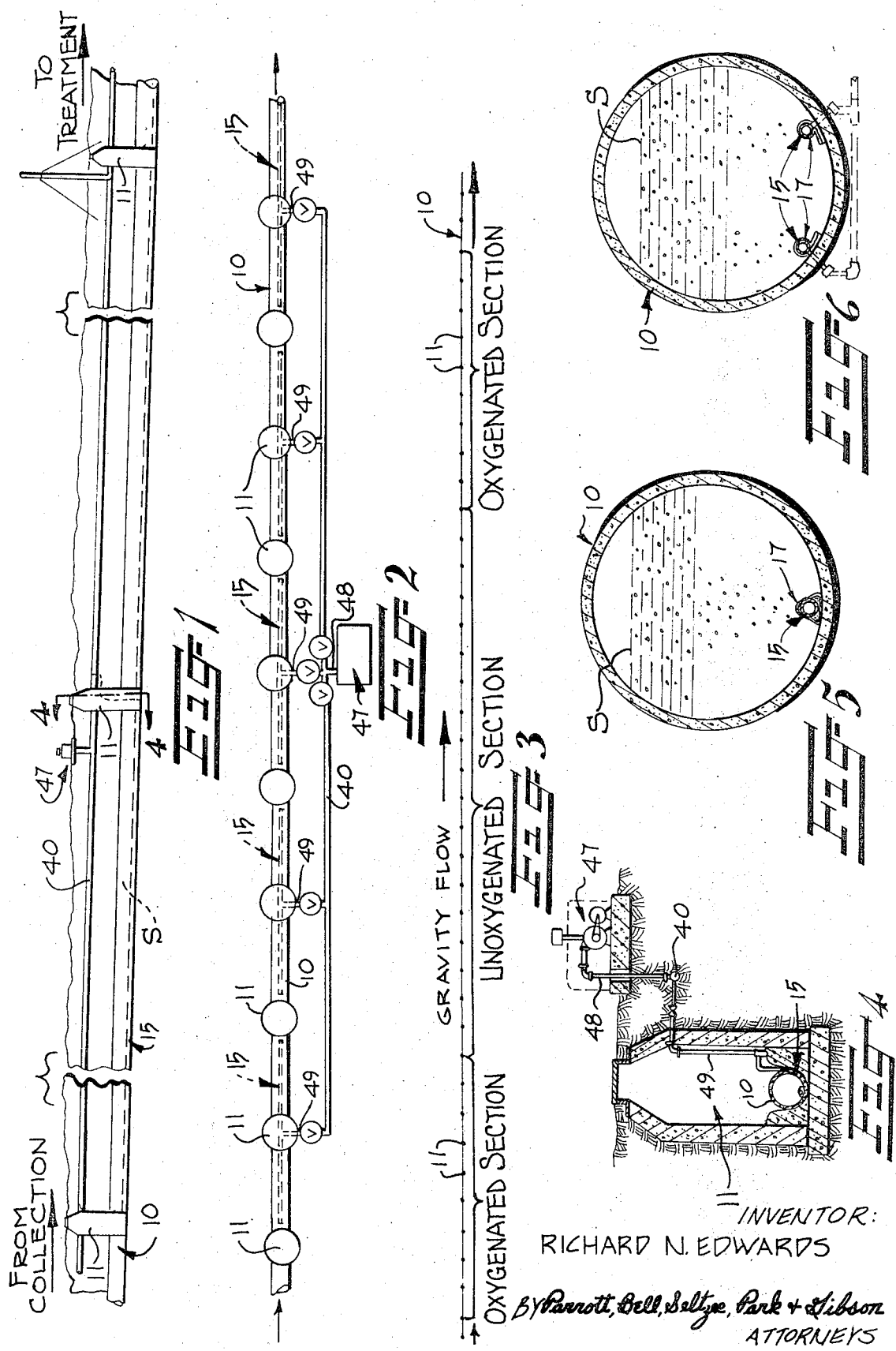

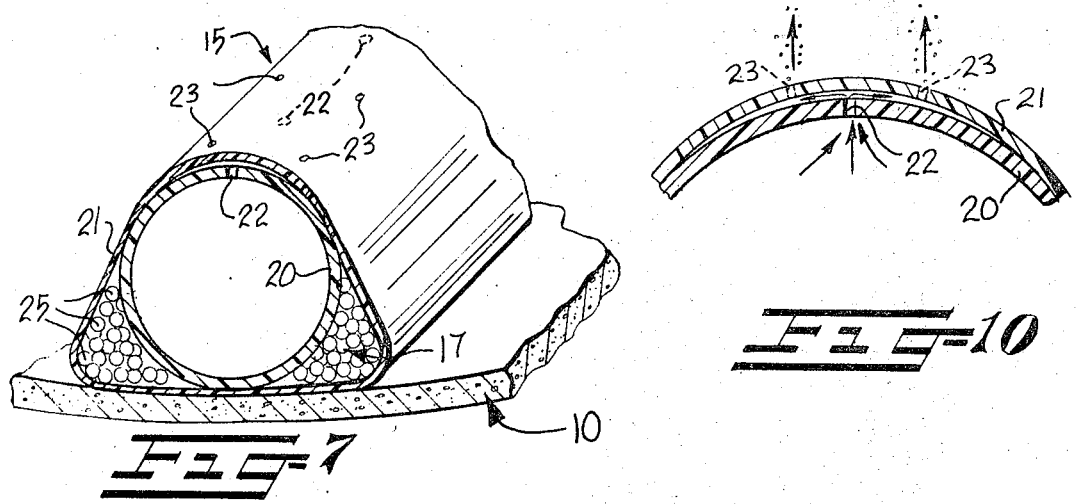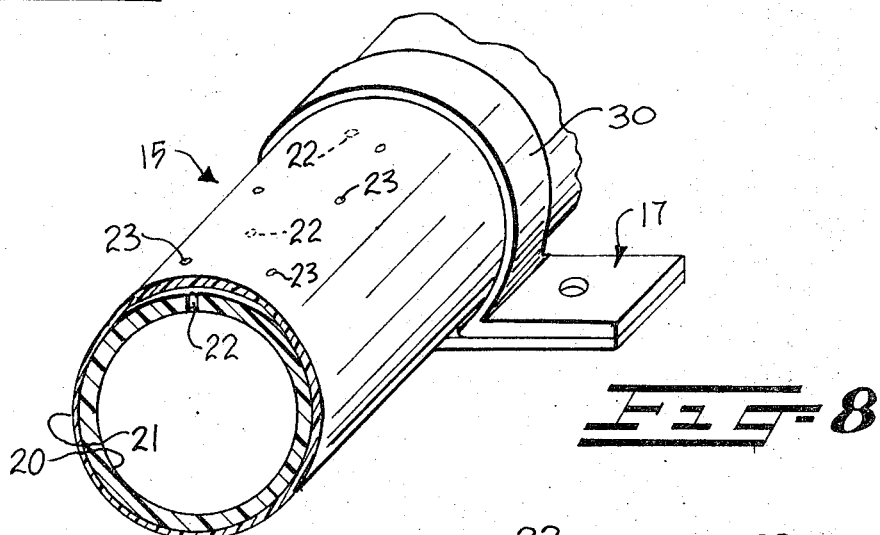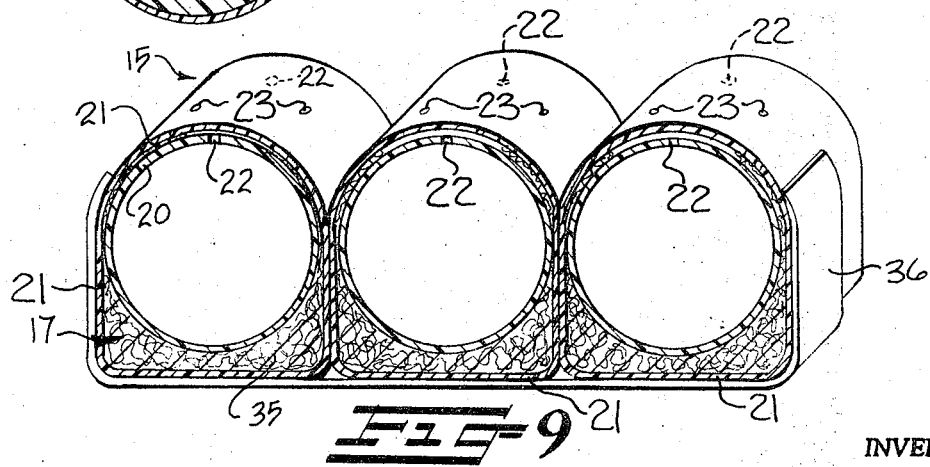

---

3,525,685
INTERMEDIATE SEWAGE TREATMENT PROCESS AND MEANS
Richard N. Edwards, 409 Vernon Terrace,
Raleigh, N.C. 27609
Filed June 25, 1969, Ser. No. 836,498
Int. Cl. C02c 1/12
U.S. Cl. 210—15                    8 Claims

ABSTRACT OF THE DISCLOSURE

The improvement of a process of and means positioned directly in a sewage transporting means of a sewage and waste collection and treatment system without changing the volumetric flow at any point therein for supplying the proper amount of oxygen to the sewage and waste to prevent the sewage and waste from becoming septic, to control the build up of undesirable sulfides, sulfates, methane gases, sulfuric acid, anaerobic bacteria and odors, and to stimulate the growth of desirable aerobic bacteria during the transportation of the sewage and waste from the point of collection to the point of treatment.

---

This invention relates to an intermediate sewage treatment process and means and more particularly to a process of and a means for supplying oxygen to sewage and waste during its transportation from a point of collection to a point of treatment in a sewage and waste collection and treatment system for the purpose of preventing the sewage and waste from becoming septic, to control the build up of undesirable chemicals and bacteria therein and to stimulate the growth of desirable aerobic bacteria.

In sewage and waste collection and treatment systems wherein sewage is collected at a point of origin and transported, often over great distances, to a treatment plant which treats the sewage for ultimate disposal, problems have long existed of the sewage becoming septic and building up undesirable sulfides, sulfates, methane gases, sulfuric acid, anaerobic bacteria and odors due to the lack of proper oxygen content therein during the transportation of the sewage and waste from the point of collection to the point of treatment. Also, the lack of proper oxygen content in the sewage and waste during its transportation thwarts the build up of desirable aerobic bacteria in the sewage.

While no satisfactory means have heretofore been proposed for overcoming these problems, it has been previously proposed to provide a series of holding tanks along the transporting means for the sewage which would allow the sewage to collect and be held in these collection tanks for supplying oxygen thereto to overcome the build up of the undesirables therein. However, these holding tanks are costly to construct, change the direction of and impede the normal volumetric flow and velocity of the sewage and waste through the transporting means, and have generally not proved practical for overcoming the above problems.

Accordingly, it is the object of this invention to provide a practical process and means to overcome the problems of sewage and waste becoming septic and building up undesirable sulfides, sulfates, methane gases, sulfuric acid, anaerobic bacteria and odors therein during its transportation from a point of collection to a point of treatment in a sewage and waste collection and treatment system. It is also an object of this invention to provide a process of and means for reducing the biological oxygen demand, chemical oxygen demand and total organic carbon and create activated sludge in the sewage and waste during the aforesaid transportation.

It is a further more specific object of this invention to overcome the aforesaid problems by providing a process of and means for supplying the proper oxygen content directly to the sewage and waste as it is being transported from the point of collection to the point of treatment in a sewage and waste collection and treatment system without changing the path of travel or the normal volumetric flow and velocity of the sewage at any point therein and which is relatively inexpensive and easy to install in either existing sewage and waste collection and treatment systems or in newly constructed systems.

It has been found by this invention that the above objects may be accomplished by providing, in a sewage and waste collection and treatment system including a means for transporting liquid sewage and waste from a point of collection to a point of treatment, an improved means positioned directly in the sewage transporting means without changing the volumetric flow at any point therein for supplying the proper amount oxygen to the sewage to prevent the sewage and waste from becoming septic, to control the build up of the undesirable chemicals and bacteria and to stimulate the growth of desirable aerobic bacteria therein.

The sewage transporting means more commonly and preferably comprises an elongate, substantially enclosed, hollow conduit for transporting sewage therethrough by gravity flow and the means for supplying oxygen to the moving sewage preferably comprises an elongate, hollow tube of less cross-sectional dimensions than the transporting conduit and which is positioned directly in the bottom portion of the sewage transporting conduit without changing the volumetric flow at any point therein. The tube contains a supply of oxygen and includes a plurality of spaced apertures therethrough for the release of oxygen therefrom into the sewage for mixing therewith by diffusion. The oxygen supplying tube preferably includes means for maintaining the tube in position in the bottom portion of the sewage transporting conduit.

In a long sewage transporting conduit means, the oxygen supplying tube may preferably comprise a plurality of tubes spaced apart longitudinally within the sewage transporting conduit for providing alternating sections therein in which oxygen is supplied to the moving sewage and in which no oxygen is supplied to the moving sewage. If a large oxygen content is required due to the volume of the moving sewage, a plurality of oxygen supplying tubes may be positioned in generally parallel relationship transversely across the bottom portion of the sewage transporting conduit.

The preferred construction for the oxygen supplying tube includes at least partially concentric inner and outer wall members in which at least the outer wall member is flexible, the inner wall includes spaced apertures therein disposed in a generally longitudinally extending line along the upper portion of the inner wall, and the outer wall includes a plurality of spaced apertures therein disposed in generally two longitudinally extending lines positioned on each side of the line of apertures in the inner wall to form substantially a one-way valve means for the passage of oxygen from the interior to the exterior of the tube means and to prevent the passage of sewage into the interior of the oxygen supplying tube means.

Some of the objects and advantages of this invention having been stated, other objects and advantages will appear as the description proceeds when taken in conjunction with the accompanying drawings, in which:

FIG. 1 is a side elevational view, broken away, of a portion of a sewage transporting means constructed according to this invention and showing the system submerged beneath the ground;

FIG. 2 is a schematic and diagrammatic view illustrating a section of a sewage and waste transporting means in which oxygen is supplied to the moving sewage;

FIG. 3 is a diagrammatic view of a portion of a sewage transporting means illustrating alternating portions therein which are oxygenated and unoxygenated;

FIG. 4 is a cross-sectional view taken generally along the line 4—4 of FIG. 1;

FIG. 5 is a cross-sectional view of the sewage transporting conduit with one form of an oxygen supplying tube positioned therein which is particularly adaptable for existing sewage treatment and waste collection systems;

FIG. 6 is a cross-sectional view of the sewage transporting conduit with a pair of oxygen supplying tubes positioned therein which are particularly adaptable for new constructions of waste collection and treatment systems;

FIG. 7 is an enlarged perspective view of the oxygen supplying tube means illustrated in FIG. 5;

FIG. 8 is an enlarged perspective view of one of the oxygen supplying tube means illustrated in FIG. 6;

FIG. 9 is an enlarged perspective view of a modified form of a plurality of parallel positioned oxygen supplying tube means particularly adaptable for an existing sewage and waste collection and treatment system; and FIG. 10 is an enlarged transverse cross-sectional view of the upper portion of the oxygen supplying tube means illustrating inner and outer wall members having lines of apertures therein forming substantially a one-way valve means.

Referring now to the drawings and particularly FIG. 1, there is shown therein a section of a means for transporting liquid sewage and waste S from a point of collection to a point of treatment. This transporting means comprises an elongate, substantially enclosed, hollow conduit 10 which transports the sewage S therethrough by gravity flow. While the conduit 10 is the more conventionally used and preferred means for the transporting of sewage and waste from a point of collection to a point of treatment, this transporting means could be any type of sewage conveyors including trunk sewers, sewer outfalls, force mains, canals and other devices designed or constructed for the purposes of conveying sewage or liquid waste. As illustrated in FIG. 1, the sewage transporting conduit 10 is located below ground and passes through conventional manholes 11 extending from the surface of the ground down to and around the sewage transporting conduit 10 at spaced intervals therealong for proper maintenance of the conduit 10.

For supplying a proper amount of oxygen to the liquid sewage or waste S as it flows through the transporting conduit 10, there is provided an elongate, hollow tube 15 of less cross-sectional dimensions than the sewage transporting conduit 10 and positioned directly in the bottom portion of the conduit 10 without changing the volumetric flow at any point therein and containing a supply of oxygen for releasing oxygen into the liquid sewage for mixing therewith by diffusion to prevent the sewage and waste from becoming septic, to control the build up of the above described undesirable chemicals and bacteria and to stimulate the growth of the above described desirable bacteria. The term "oxygen" as used herein is intended to cover any gas or air which contains oxygen.

The size of the oxygen supplying tube 15 and the length thereof would vary according to field conditions for each installation. Influencing factors would be diameter of the sewage transporting conduit 10, quantity and quality of sewage and waste liquid flowing therein, conduit slope and velocity of sewage, and peak load time periods. Field calculations would determine the oxygen supplying tube size, for example, by applying horsepower requirements to distance and friction losses at various velocities to arrive at the most economical installation.

The oxygen supplying tube 15 includes generally a means 17 for maintaining the tube 15 in position in the bottom portion of the conduit means. This position maintaining means 17 could take various forms for various types of installations, as will be described specifically below.

The oxygen supplying tube 15 may be constructed of any suitable material, such as flexible plastic material, which will have sufficient structural strength to prevent collapse of the tube under submerged conditions within the liquid sewage and waste S when the oxygen or air pressure in the tube is at atmospheric pressure. Preferably, the oxygen supplying tube 15 is constructed of a pair of at least partially concentric inner and outer wall members 20 and 21, as may be seen in FIGS. 7-10. Normally, the outer wall member 21 is in the form of a plastic sheath of thinner and more flexible material that the inner wall member 20. The outer wall member 21 may be bonded to the inner wall member 20 in any desirable manner and preferably at spaced locations leaving the upper portions of the respective walls unbonded.

For dispensing oxygen from the interior of the oxygen supplying tube 15 into the moving liquid sewage S, the inner wall member 20 thereof includes a plurality of spaced apertures 22 disposed in a generally longitudinally extending line along the upper portion thereof, as shown in FIGS. 7-10. The outer wall member 21 includes a plurality of spaced apertures 23 disposed in generally two longitudinally extending lines positioned on each side of the line of apertures 22 in the inner wall 20 and being in staggered positions with respect to the apertures 22 to form substantially a one-way valve means for the passage of oxygen from the interior to the exterior of the tube 15. This is accomplished when the pressure within the tube 15 is greater than the pressure on the outside of the tube 15 allowing the flow of oxygen through the apertures 22 in the inner wall member 20 and along the unbonded space between wall members 20 and 21 and out of the apertures 23 in the outer wall member 21, as may be seen in FIG. 10. If the pressure on the outside of the tube 15 exceeds the pressure on the inside of tube 15, the outer wall 21 will be forced in close contact with the inner wall 20 and thus close the space therebetween and prevent the flow of liquid sewage and waste S into the interior of the tube 15.

As discussed above, the oxygen supplying tube 15 includes suitable means 17 for maintaining the tube 15 in the bottom portion of the sewage conveying conduit 10. One form of this means 17 is illustrated in FIG. 7 and may comprise weights in the form of pellets or granules 25 disposed between unbonded portions of the inner and outer wall members 20 and 21 for weighting and maintaining the oxygen supply tube 15 in the bottom portion of the sewage conveying conduit 10. This construction is particularly adaptable for installation in existing waste collection and treatment systems inasmuch as access may be obtained to the interior of existing sewage transporting conduit 10 through manholes 11 without interrupting the flow of sewage S in the conduit 10 by feeding the tube 15 through the open manhole top, down the manhole into the sewage conduit 10. A pull line from the next manhole 11 could be used to pull the tube 15 through the conduit 10 to the desired length. Inasmuch as the tube 15 includes the position maintaining means 17, illustrated in FIG. 7, it would assume a position along the bottom portion of the sewage transporting conduit 10, in the manner illustrated in FIG. 5.

Referring to FIG. 8, an alternative position maintaining means 17 is illustrated which is particularly adaptable for use in new installations or constructions of sewage and waste collection and treatment systems. The positioning means 17 comprises a collar and bracket 30 which encircles the tube 15 and forms an extension therefrom having an aperture therethrough for permanent attachment to the sewage transporting conduit 10 in a manner dependent upon the type of material utilized in the transporting conduit 10. This attachment could be effected by the use of a bolt and nut or other suitable means passing through the aperture in the collar and bracket 30 and into the conduit 10.

Referring to FIG. 9, there is illustrated a further alternative construction of positioning means 17 which is particularly adaptable for installation into existing sewage and waste collection and treatment systems. In this construction, there is utilized, in lieu of the weighted pellets 25 of FIG. 7, compressed preformed flexible lead wool 35 as the weighting material. This lead wool 35 is positioned, as the weighted pellets 25 of FIG. 7, between unbonded portions of the inner and outer wall members 20 and 21 of the tube 15.

If the oxygen requirement in the moving sewage S is such that a single oxygen supplying tube 15 would not supply the proper amount of oxygen, a plurality of these tubes 15 may be positioned in the bottom portion of the sewage conveying conduit 10 in parallel arrangement transversely across the conduit means 10. If the tube 15 with the positioning lead wool 35 of FIG. 9 or the weighting pellets 25 of FIG. 7 were utilized in this manner, a U-shaped bracket 36 could be provided for holding a plurality of these tubes 15 in parallel arrangement, as shown in FIG. 9. For new constructions utilizing the tube means 15 with the positioning bracket 30 of FIG. 8, an arrangement such as shown in FIG. 6 wherein two tubes 115 are permanently secured in spaced parallel relationship transversely across the bottom of the sewage conveying conduit 10 could be utilized.

For supplying oxygen to the tubes 15, there is provided an elongate air distribution conduit 40 (see FIGS. 1 and 2) which is positioned externally of and extends in generally the same direction as the sewage transporting conduit 10. As may be seen in FIG. 1, the air distribution conduit 40 would normally be installed below ground preferably at a minimum depth of approximately two feet and in all cases below the frost line. The air distribution conduit 40 could be constructed of any suitable material which is compatible with the soil pH and resistivity as well as corrosive sewage environment.

The air distribution conduit 40 is connected with a source of oxygen or air containing oxygen which may be any convenient source such as a driven blower unit 47 or a plurality of blower units 47 which pull air in from the atmosphere or other source thereof. The blower unit 47 may be located above grade or may be located underground, as desired. A connecting pipe 48 would be utilized to connect the blower unit 47 with the air distribution conduit 40. The air distribution conduit 40 would further include a desired number of transversely extending connecting conduits 49 leading therefrom to the oxygen supplying tubes 15. Preferably, these connecting conduits 49 would extend into open manholes 11 for convenient access and attachment. The oxygen supplying system would further include any desired arrangement of valves, such as indicated schematically in FIG. 2, for controlling the flow of oxygen or air containing oxygen to the distribution conduit 40 and to the tubes 15.

In extremely long sewage conveying conduits 10, it may be desirable to have alternating portions, which are oxygenated or in which oxygen is supplied to the moving sewage S and portions are unoxygenated or in which no oxygen is supplied to the moving sewage S, inasmuch as the moving sewage S could be saturated with oxygen in the oxygenated sections and this oxygen would not be used up until another oxygenated section is reached. For this type of construction, as is illustrated diagrammatically in FIG. 3, the elongate oxygen supplying tubes 15 would be spaced apart longitudinally within the sewage transporting conduit 10 for providing such alternating sections. The length of an oxygenated section and an unoxygenated section would depend upon field calculations and other considerations pointed out above with respect to pipe size. Also, any convenient arrangement of air distribution conduits, etc., for supplying oxygen to the oxygenated sections could be utilized.

By the above described construction and its alternatives, a system has been provided for intermediate treatment of moving sewage with oxygen between the point of collection and the point of treatment which will prevent the sewage and waste from becoming septic, will control the build up of undesirable chemicals and bacteria, and will promote or stimulate the growth of desirable bacteria. By this arrangement, the volumetric flow of the moving sewage has been unaltered and expensive and unsatisfactory holding tanks have been eliminated. Moreover, by supplying oxygen to the moving sewage or waste S continuously or intermittently as it is being conveyed, a long oxygen contact time for a small volume of moving sewage S can be obtained without the necessity of the construction of expensive and undesirable holding tanks.

For example, sewage flowing at a velocity of 2 feet per second (minimum design velocity required by most regulatory agencies) through 5,000 linear feet of oxygenated transporting conduit would have the following calculated contact time: 5,000÷2=2,500 seconds, 2,500 seconds ÷60 seconds=41 minutes contact time. Thus, each cubic feet of sewage S entering the upstream end of the oxygenated transporting conduit section would receive 41 minutes of contact time to absorb oxygen before leaving this oxygenated section. The sewage S leaving the oxygenated section of the transporting conduit would then continue through an unoxygenated section until nearly depleted of dissolved oxygen before entering the next oxygenated section, as may be seen in FIG. 3.

In the oxygenated section, small air bubbles containing oxygen are dispensed through a minimum volume of the sewage S as it is being transported along the conduit 10. Due to the friction drag where the sewage S contacts the conduit wall, the fluid adjacent to the wetted perimeter area moves slower than the liquid in the center of the conduit; thus, a natural mixing action occurs, allowing all of the liquid to come into position for dissolving oxygen from the air bubbles. This mixing action places the dissolved oxygen liquid constantly against the conduit walls where bacteria growth is concentrated and the aerobic bacteria process will be speeded up, thus reducing the biological oxygen demand of the sewage S as it is being transported. The space above the liquid level of sewage S that occurs in all properly designed conduits 10 is normally occupied with sewage gases and contains little or no oxygen. In oxygenated sections, the air bubbles escaping from the liquid sewage surface will keep this space filled with air containing oxygen and force the lighter sewage gases out of the sewer system, thus allowing a constantly changing liquid surface to further promote oxygen absorption by the sewage.

The dissolved oxygen in the sewage will destroy or retard the reproduction of anaerobic bacteria, thus preventing the sewage from becoming septic and forming sulfides and methane gases; it will also tend to oxidize any sulfides or sulfates that might form. The updraft of bubbles released from the tubes 15 will also cause an upflow of the liquid adjacent to the bubbles. This action will aid the mixing process and keep heavier solids in suspension where the aerobic bacteria in the solids will intermittently be in contact with the oxygen in the bubbles. The bubbles will normally not rise vertically but will rise diagonally in the direction of liquid flow.

In the drawings and specification, there have been set forth preferred embodiments of the invention and, although specific terms are employed, they are used in a generic and descriptive sense only and not for purposes of limitation.

What is claimed is:

1. In a sewage and waste collection and treatment system including an elongate, substantially enclosed, hollow conduit means of substantially constant cross-sectional area throughout its length for transporting by gravity flow, from a point of collection to a point of treatment, liquid sewage and waste which has tendencies to become septic and build up undesirable sulfides, sulfates, methane gases, sulfuric acid, anaerobic bacteria and odors therein during its transportation due to the lack of proper oxygen content therein; the improvement of elongate, hollow tube means of less cross-sectional dimensions than said sewage transporting conduit means and being positioned directly in the bottom portion of said sewage transporting conduit means without changing the volumetric flow of the sewage at any point therein and containing a supply of oxygen for releasing the oxygen into the liquid sewage as it flows through said transporting conduit means for mixing therewith by diffusion to prevent the sewage and waste from becoming septic, to control the build up of said undesirables and to stimulate the growth of desirable aerobic bacteria, said tube means for supplying oxygen including means for maintaining said tube means in position in the bottom portion of said conduit means and comprising a pair of at least partially concentric inner and outer wall members in which at least said outer wall is somewhat flexible, said inner wall including a plurality of spaced apertures therein disposed in a generally longitudinally extending line along the upper portion of said inner wall, said outer wall including a plurality of spaced apertures therein disposed in generally two longitudinally extending lines positioned on each side of said line of apertures in said inner wall to form substantially a one-way valve means for the passage of oxygen from the interior to the exterior of said tube means.

2. In a sewage and waste collection and treatment system, as set forth in claim 1, wherein said tube means for supplying oxygen to the sewage comprises a plurality of elongate tube means spaced apart longitudinally within said sewage transporting conduit means for providing alternating sections within said conduit means in which oxygen is supplied to the moving sewage and in which no oxygen is supplied to the moving sewage.

3. In a sewage and waste collection and treatment system, as set forth in claim 1, wherein said tube means for supplying oxygen to the sewage comprises a plurality of elongate tube means positioned in generally parallel relationship transversely across the bottom portion of said sewage transporting conduit means.

4. In a sewage and waste collection and treatment system, as set forth in claim 1, including means for supplying oxygen to said tube means comprising a source of oxygen, an elongate air distribution conduit connected with said source of oxygen and positioned externally of and extending in generally the same direction as said sewage transporting conduit and including a plurality of connecting conduits leading from said air distribution conduit, through said sewage transporting conduit and into said tube means for supplying oxygen thereto.

5. A process of treating liquid sewage and waste to prevent it from becoming septic and building up undesirable sulfides, sulfates, methane gases, sulfuric acid, anaerobic bacteria, odors, and the like due to a lack of proper oxygen content therein during its transportation from a point of collection to a point of normal treatment, said process comprising the steps of:
  conventionally transporting the liquid sewage and waste through a conduit means having a substantially constant cross-sectional area throughout its length from its point of collection along an elongate path of travel to its point of normal treatment, and
  successively treating the traveling sewage and waste directly in the means used for said transporting throughout its path of travel from the point of collection to the point of treatment with a predetermined amount of oxygen necessary for maintaining a sufficient oxygen content therein to control the build up of the undesirables and to stimulate the growth of desirable aerobic bacteria without changing the normal volumetric flow, velocity and path of travel of the sewage and waste during said transporting step.

6. A process of treating liquid sewage and waste, as set forth in claim 5, wherein said step of conventionally transporting comprises transporting the liquid sewage and waste by gravity flow through an elongate, substantially enclosed, hollow conduit means, and wherein the step of successively treating the traveling sewage and waste includes diffusing oxygen from an elongate, hollow tube means of less cross-sectional dimensions than the transporting conduit means and positioned directly in the bottom portion of the transporting conduit means so as not to change the normal volumetric flow, velocity and path of travel of the sewage and waste.

7. A process of treating liquid sewage and waste, as set forth in claim 5, wherein said step of treating the traveling sewage and waste includes diffusing a predetermined amount of oxygen necessary for maintaining a sufficient oxygen content in the traveling sewage and waste successively at spaced apart locations along the path of travel of the sewage and waste during the transporting step so that there are alternating portions of the path of travel of the sewage and waste during the transporting step in which oxygen is supplied and portions in which no oxygen is supplied.

8. A process of treating liquid sewage and waste to prevent it from becoming septic and building up undesirable sulfides, sulfates, methane gases, sulfuric acid, anaerobic bacteria, odors, and the like due to a lack of proper oxygen content therein during its transportation from a point of collection to a point of normal treatment, said process comprising the steps of:
  conventionally transporting the liquid sewage and waste from its point of collection along an elongate path of travel to its point of normal treatment by gravity flow through an elongate, substantially enclosed, hollow conduit means having a substantially constant cross-sectional area throughout its length, and
  successively treating the traveling sewage and waste throughout its path of travel from the point of collection to the point of treatment with a predetermined amount of oxygen necessary for maintaining a sufficient oxygen content therein to control the build up of the undesirables and to stimulate the growth of desirable aerobic bacteria without changing the normal volumetric flow, velocity and path of travel of the sewage and waste during said transporting step by diffusing oxygen from elongate hollow tube means of less cross-sectional dimensions than the transporting conduit means and positioned directly in the bottom portion of the transporting conduit means at spaced apart locations therealong so that there are alternating portions of the path of travel of the sewage and waste during the transporting step in which oxygen is supplied and portions in which no oxygen is supplied.

References Cited

UNITED STATES PATENTS

| | | | |
|---|---|---|---|
| 1,963,354 | 6/1934 | Currie | 210—199 X |
| 2,583,725 | 1/1952 | Brown et al. | 210—220 X |
| 3,186,644 | 6/1965 | Ross et al. | 261—124 |

JAMES L. DE CESARE, Primary Examiner

U.S. Cl. X.R.

210—170, 199, 220; 261—124